(12) United States Patent  
Agarwal (10) Patent No.: US 8,108,715 B1
(45) Date of Patent: Jan. 31, 2012

(54) SYSTEMS AND METHODS FOR RESOLVING SPLIT-BRAIN SCENARIOS IN COMPUTER CLUSTERS

(75) Inventor: Sandeep Agarwal, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 12/830,285

(22) Filed: Jul. 2, 2010

(51) Int. Cl.
*G06F 11/00* (2006.01)

(52) U.S. Cl. ............... 714/10; 714/4.1; 714/12; 714/13; 714/25

(58) Field of Classification Search .................. None
See application file for complete search history.

(56) References Cited

U.S. PATENT DOCUMENTS

| | | | | |
|---|---|---|---|---|
| 6,353,898 | B1 * | 3/2002 | Wipfel et al. | 714/48 |
| 6,785,678 | B2 * | 8/2004 | Price | 707/999.008 |
| 7,016,946 | B2 * | 3/2006 | Shirriff | 709/221 |
| 7,590,737 | B1 * | 9/2009 | Chen et al. | 709/226 |
| 7,739,541 | B1 * | 6/2010 | Rao et al. | 714/4.1 |
| 7,840,833 | B2 * | 11/2010 | Tripathi et al. | 714/4.1 |
| 2004/0078654 | A1 * | 4/2004 | Holland et al. | 714/13 |

OTHER PUBLICATIONS

System Administration Guide: Network Interfaces and Network Virtualization; http://docs.sun.com/app/docs/doc/819-6990/gfkcy?l=en&a=view&q=system+administration+guide%3B+network+interfaces+and+network+virtualization; taken from site on Apr. 28, 2010.

* cited by examiner

*Primary Examiner* — Michael Maskulinski
(74) *Attorney, Agent, or Firm* — Advantedge Law Group (57) ABSTRACT

A computer-implemented method for resolving split-brain scenarios in computer clusters may include (1) identifying a plurality of nodes within a computer cluster that are configured to collectively perform at least one task, (2) receiving, from a node within the computer cluster, a failure notification that identifies a link-based communication failure experienced by the node that prevents the nodes within the computer cluster from collectively performing the task, and, upon receiving the failure notification, (3) immediately prompting each node within the computer cluster to participate in an arbitration event in order to identify a subset of the nodes that is to assume responsibility for performing the task subsequent to the link-based communication failure. Various other methods, systems, and computer-readable media are also disclosed.

20 Claims, 6 Drawing Sheets

SYSTEMS AND METHODS FOR RESOLVING SPLIT-BRAIN SCENARIOS IN COMPUTER CLUSTERS

BACKGROUND

Computer clusters often include multiple nodes that are configured to collectively perform one or more computing tasks, such as providing access to various services (such as applications or databases). Unfortunately, nodes within a computer cluster may occasionally experience communication failures that prevent the nodes from collectively performing such computing tasks. For example, a node within a computer cluster may experience a network-interface-controller ("NIC") failure that prevents the node from communicating with other nodes within the computer cluster. This communication failure may lead to a scenario (commonly known as a "split-brain" scenario) in which multiple nodes within the computer cluster attempt to individually perform similar or identical computing tasks (such as writing data to and/or reading data from a shared resource) without communicating with one another, potentially resulting in data corruption and/or application unavailability.

In order to resolve split-brain scenarios, nodes within a computer cluster may employ failure-detection technology that monitors the health and communication capabilities of each node. Conventional failure-detection technologies are typically divided into two main techniques: (1) link-based failure-detection techniques and (2) probe-based failure-detection techniques. In link-based failure-detection techniques, a node's network-interface driver may monitor the link state of the node's network interface and immediately notify the node when this link state changes. In contrast, in probe-based failure-detection techniques a node may periodically (e.g., every 16 or 32 seconds) probe or test various communication paths within the computer cluster to ensure that they are active.

Upon detecting a communication failure using either technique, a node may attempt to contact a coordination point server in an effort to secure responsibility for performing the computing tasks originally collectively performed by all nodes within the computer cluster. The coordination point server may then select a subcluster of nodes within the computer cluster that is to assume responsibility for performing the computing tasks based on a number of factors, including which subcluster includes the node that was the first to contact the coordination point server subsequent to the communication failure.

Unfortunately, the above process (often referred to as an arbitration event or "fencing race") may be heavily biased in favor of nodes that receive link-based failure notifications. For example, since a node typically receives immediate notification upon experiencing a link-based failure (such as failure of the node's NIC), this node may identify such a communication failure several seconds before all other nodes within the computer cluster, which nodes may be unaware of the node's NIC failure until detecting the same via a periodic (e.g., 16 or 32 second-interval) probe-based failure-detection technique. Since a coordination point server generally limits responsibility for performing computing tasks to a subcluster that includes the node that is the first to contact the coordination point, these other nodes may be unfairly disadvantaged in their efforts to secure responsibility for performing the computing tasks. As such, the instant disclosure identifies a need for efficiently and effectively resolving split-brain scenarios in computer clusters by immediately notifying each node within a computer cluster of communication failures.

SUMMARY

As will be described in greater detail below, the instant disclosure generally relates to systems and methods for efficiently and effectively detecting and resolving split-brain scenarios in computer clusters, potentially reducing application unavailability and/or downtime resulting from such failures. In one example, one or more of the systems described herein (such as a coordination point server) may accomplish such a task by (1) identifying a plurality of nodes within a computer cluster that are configured to collectively perform at least one task (such as providing access to various databases and/or applications), (2) receiving, from a node within the computer cluster, a failure notification that identifies a link-based communication failure experienced by the node (such as failure of the node's NIC, failure of a cable connected to the node's NIC, disconnection of the cable connected to the node's NIC, or failure of a network switch connected to the node's NIC) that prevents the nodes within the computer cluster from collectively performing the task, and then, upon receiving the failure notification, (3) immediately prompting each node within the computer cluster to participate in an arbitration event (such as a fencing race) in order to identify a subset of nodes that is to assume responsibility for performing the task subsequent to the link-based communication failure.

In some examples, the coordination point server may be capable of communicating with each node within the computer cluster subsequent to the link-based communication failure and may receive the failure notification via a kernel-level, low-latency transport mechanism. In addition, the link-based communication failure experienced by the node may be identified within a carrier-loss notification generated by the node's operating system. For example, an operating system running on the node may detect a failure of the node's NIC and generate a carrier-loss notification to immediately notify the node of the NIC failure.

In some examples, the coordination point server may prompt each node within the computer cluster to participate in the arbitration event by immediately broadcasting (via, e.g., a kernel-level, low-latency transport mechanism) an instruction to participate in the arbitration event to each node within the computer cluster. As will be described in greater detail below, the coordination point server may use this arbitration event to identify a subset of nodes that is to assume responsibility for performing the task subsequent to the link-based communication failure.

For example, the arbitration event may represent a fencing race in which each node attempts to be the first to contact the coordination point server. Subsequent to initiation of the fencing race, the coordination point server may identify the node that is the first to contact the coordination point server and then identify a subcluster (i.e., subset of nodes) within the computer cluster that includes the node that is the first to contact the coordination point server. Upon identifying this subcluster, the coordination point server may limit responsibility for performing the task to the subcluster, thereby preventing any node that is not included in the subcluster from performing the task.

As will be described in greater detail below, by causing nodes within a computer cluster that experience link-based communication failures to notify a coordination point server immediately upon detecting such failures, the systems and methods described herein may enable the coordination point server to immediately notify all other nodes within the computer cluster of such failures, thus ensuring that all nodes within the cluster begin participating in the resulting arbitration event at substantially similar points in time. In addition, since the various systems and methods described herein may enable the coordination point sever to immediately prompt each node within the cluster to participate in the arbitration event subsequent to the link-based communication failure, these systems and methods may identify and resolve split-brain scenarios much faster than periodic (e.g., 16 or 32 second-interval) probe-based communication failure-detection techniques, potentially resulting in reduced application unavailability and/or downtime.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for efficiently detecting and resolving split-brain scenarios in computer clusters. The phrase "computer cluster," as used herein, may refer to a group of two or more nodes (e.g., two or more computing devices) that are capable of communicating with one another in order to collectively perform one or more tasks, such as providing access to various services (such as applications or databases). Computer clusters may also incorporate one or more shared resources (such as storage devices) and/or a coordination point server that is capable of resolving split-brain scenarios. Examples of computer clusters include, without limitation, high-availability clusters, load-balancing clusters, Beowolf clusters, high-performance computing clusters, or any other suitable computer clusters.

Figure 1:
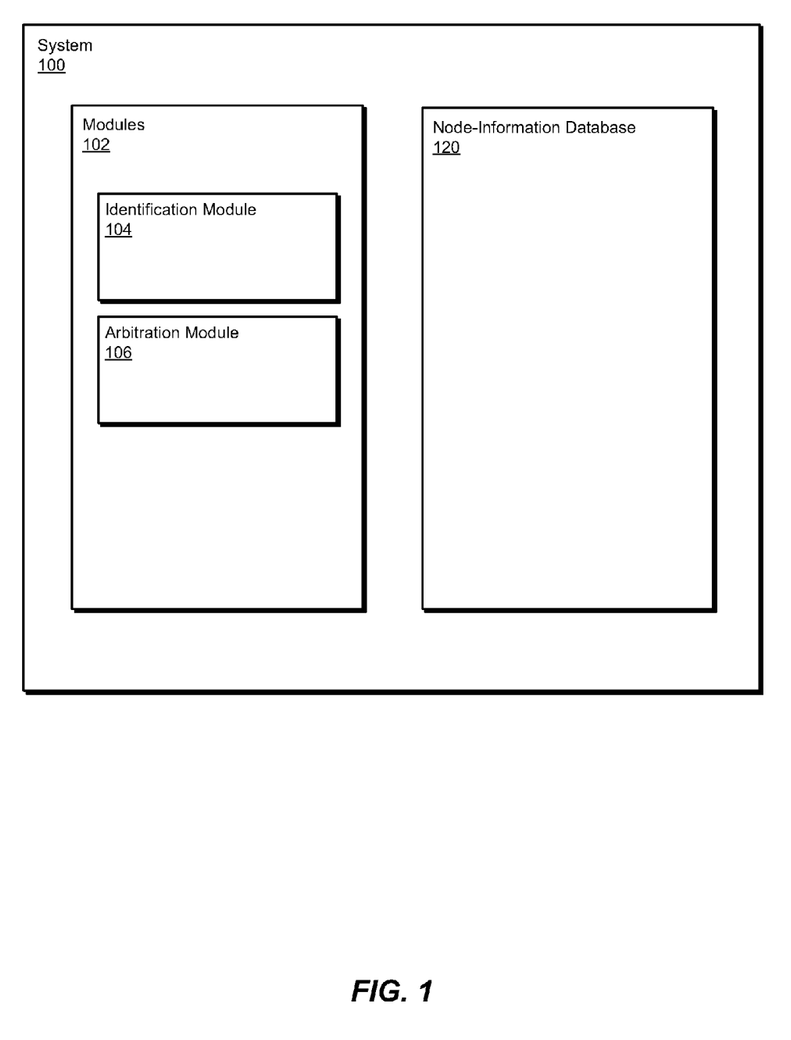
FIG. 1 is a block diagram of an exemplary system for resolving split-brain scenarios in computer clusters.
Figure 2:
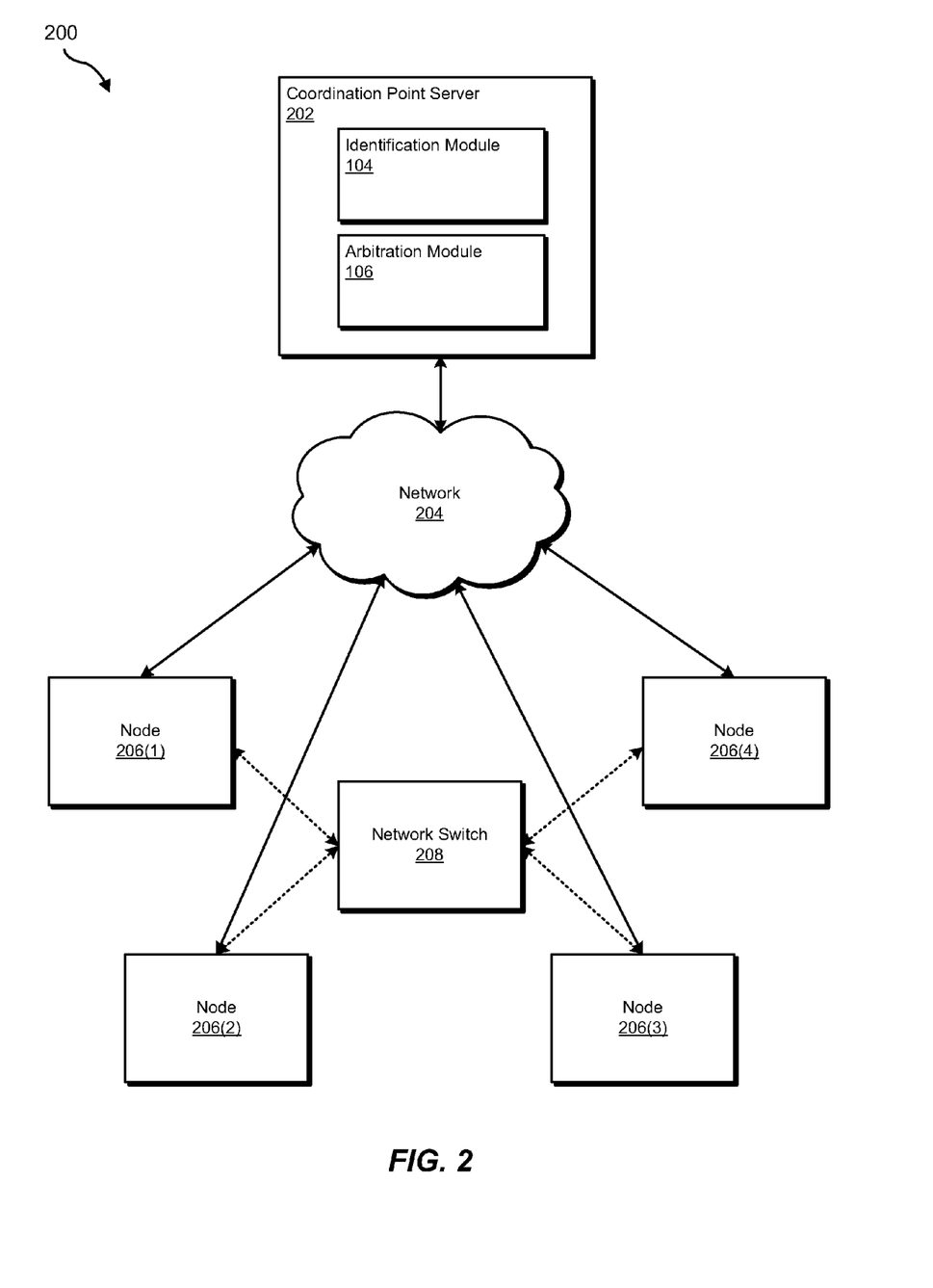
FIG. 2 is a block diagram of an exemplary system for resolving split-brain scenarios in computer clusters.
Figure 3:
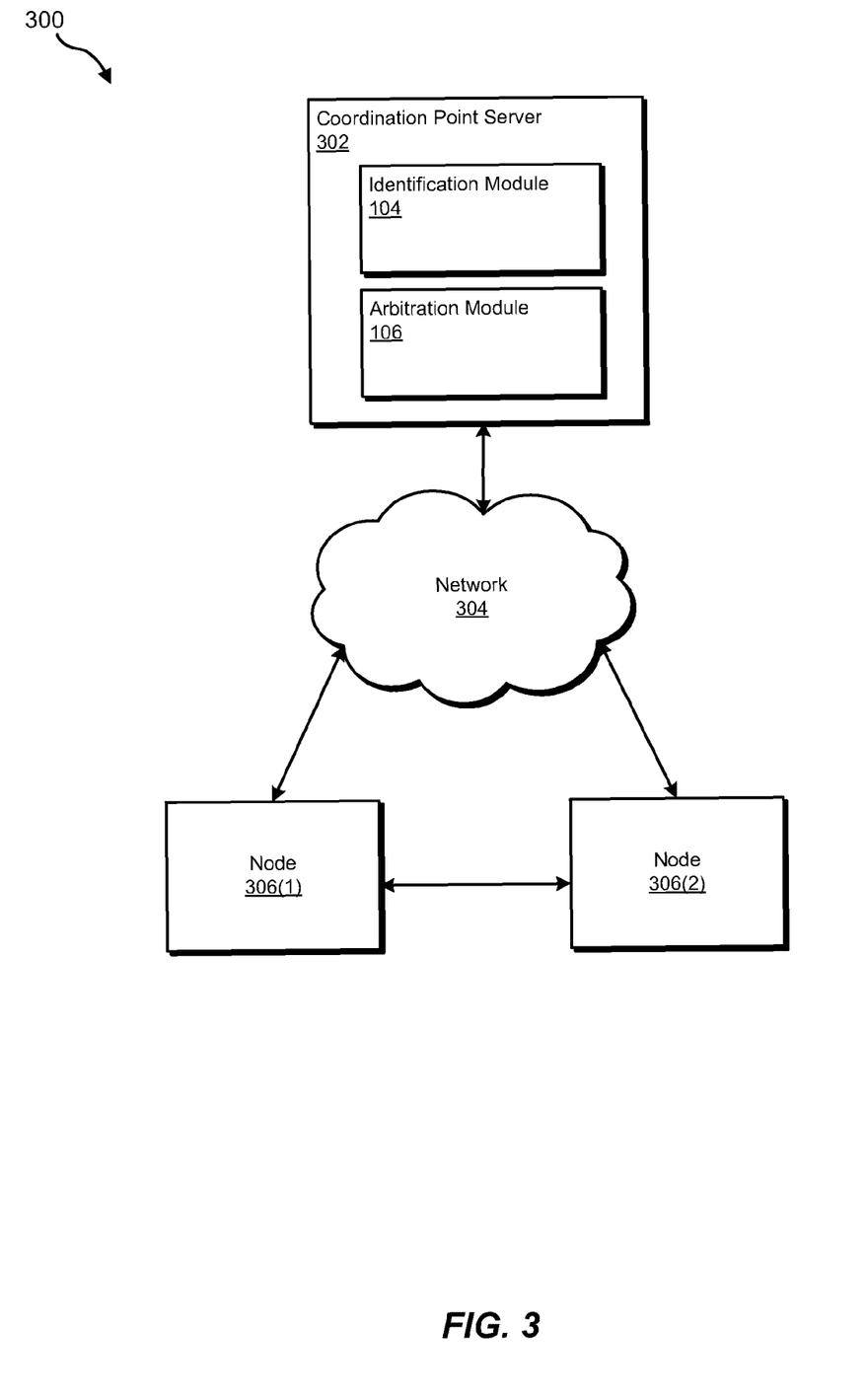
FIG. 3 is a flow diagram of an exemplary system for resolving split-brain scenarios in computer clusters.

The following will provide, with reference to FIGS. 1-3, detailed descriptions of exemplary systems for resolving split-brain scenarios in computer clusters. Detailed descriptions of corresponding computer-implemented methods will also be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for resolving split-brain scenarios in computer clusters. As illustrated in this figure, exemplary system 100 may include one or more modules 102 for performing one or more tasks. For example, and as will be explained in greater detail below, exemplary system 100 may include an identification module 104 programmed to identify a plurality of nodes within a computer cluster that are configured to collectively perform at least one task.

In addition, and as will be described in greater detail below, exemplary system 100 may also include an arbitration module 106 programmed to (1) receive a failure notification that identifies a link-based communication failure experienced by a node that prevents the nodes within the computer cluster from collectively performing the task, and, upon receiving the failure notification, (2) immediately prompt each node within the computer cluster to participate in an arbitration event in order to identify a subset of the nodes that is to assume responsibility for performing the task subsequent to the link-based communication failure. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., coordination point server 202 and/or nodes 206(1)-(4)), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include a node-information database 120. Node-information database 120 may represent portions of a single database or computing device or a plurality of databases or computing devices. In one embodiment, node-information database 120 may include information about each node within a computer cluster. More specifically, node-information database 120 may include information that identifies each node, a physical or virtual location of each node, an identification address (e.g., an IP address or a MAC address), a node registration key, a corresponding subcluster associated with each node within a computer cluster, or the like.

Node-information database 120 in FIG. 1 may represent a portion of one or more computing devices. For example, node-information database 120 may represent a portion of coordination point server 202 in FIG. 2, computing system 510 in FIG. 5, and/or portions of exemplary network architecture 600 in FIG. 6. Alternatively, node-information database 120 in FIG. 1 may represent one or more physically separate devices capable of being accessed by a computing device, such as coordination point server 202 in FIG. 2, computing system 510 in FIG. 5, and/or portions of exemplary network architecture 600 in FIG. 6.

Exemplary system 100 in FIG. 1 may be deployed in a variety of ways. For example, all or a portion of exemplary system 100 may represent portions of exemplary system 200 in FIG. 2. As shown in FIG. 2, system 200 may include a coordination point server 202 in communication with a plurality of nodes 206(1)-(4) via a network 204. System 200 may also include a network switch 208 that facilitates communication between nodes 206(1)-(4).

In one embodiment, and as will be described in greater detail below, coordination point server 202 may be programmed to (1) identify a plurality of nodes within a computer cluster (e.g., nodes 206(1)-(4)) that are configured to collectively perform at least one task (such as providing access to at least one software application), (2) receive, from a node within the computer cluster (e.g., node 206(1)), a failure notification that identifies a link-based communication failure experienced by the node (such as a failure of the node's NIC, a failure of a cable connected to the node's NIC, or a disconnection of the cable connected to the node's NIC) that prevents the nodes within the computer cluster from collectively performing the task, and then, upon receiving the failure notification, (3) immediately prompt each node within the computer cluster to participate in an arbitration event (such as a fencing race) in order to identify a subset of the nodes that is to assume responsibility for performing the task subsequent to the link-based communication failure.

Coordination point server 202 generally represents any type or form of computing device that is capable of resolving split-brain scenarios in computer clusters subsequent to a communication failure. In some examples, coordination point server 202 may be capable of communicating with each node within a computer cluster subsequent to a communication failure.

Nodes 206(1)-(4) generally represent any type or form of computing device within a computer cluster that is capable of reading computer-executable instructions and communicating with other computing devices. Nodes 206(1)-(4) may be programmed to individually and/or collectively perform tasks by coordinating operations with one or more additional nodes within the computer cluster. Examples of nodes 206(1)-(4) include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between coordination point server 202 and nodes 206(1)-(4).

Network switch 208 generally represents any intermediary device that facilitates direct communication between two or more nodes within a computer cluster. For example, network switch 208 in FIG. 2 may facilitate direct communication between nodes 206(1)-(4). Examples of network switches include, without limitation, network bridges, multilayer switches, network hubs, signal repeaters, packet switches, routers, or any other suitable networks switches. Although FIG. 2 illustrates a single network switch 208 used to facilitate communication between nodes 206(1)-(4), additional computer cluster topologies may include two or more network switches used to facilitate communication between nodes within a computer cluster.

In addition, all or a portion of exemplary system 100 may represent portions of exemplary system 300 in FIG. 3. As shown in FIG. 3, system 300 may include a coordination point server 302 in communication with nodes 306(1)-(2) via a network 304. In this example, nodes 306(1)-(2) may be capable of facilitating communication between one another without the use of a network switch. Descriptions and examples of coordination point server 302, nodes 306(1)-(2), and network 304 may include those descriptions and examples provided above in connection with coordination point server 202, nodes 206(1)-(4), and network 204 in FIG. 2.

Figure 4:
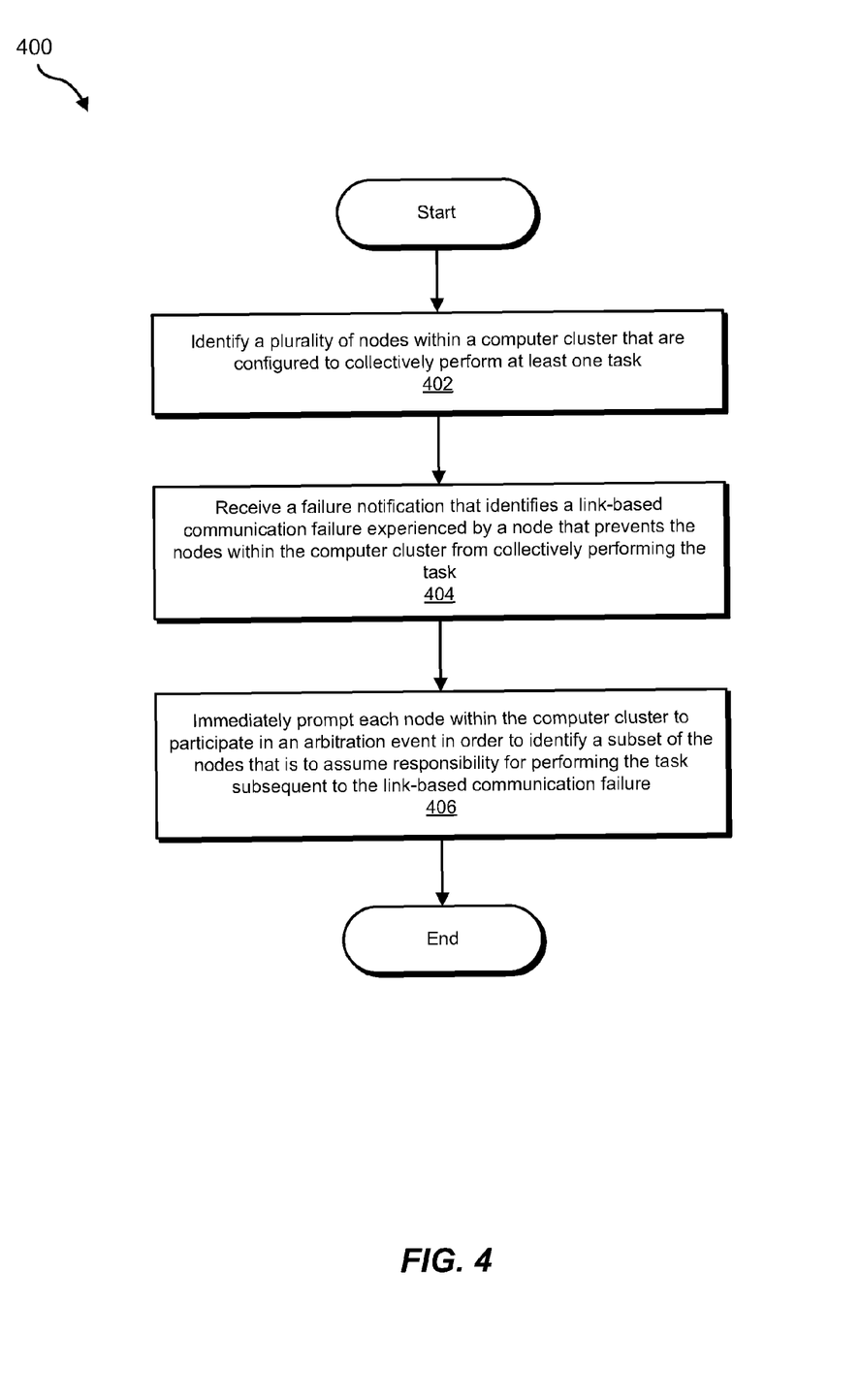
FIG. 4 is a flow diagram of an exemplary method for resolving split-brain scenarios in computer clusters.

FIG. 4 is a flow diagram of an exemplary computer-implemented method 400 for detecting and resolving split-brain scenarios in computer clusters. The steps shown in FIG. 4 may be performed by any suitable computer-executable code and/or computing system. In some embodiments, the steps shown in FIG. 4 may be performed by one or more of the components of system 100 in FIG. 1, system 200 in FIG. 2, system 300 in FIG. 3, computing system 510 in FIG. 5, and/or portions of exemplary network architecture 600 in FIG. 6.

As illustrated in FIG. 4, at step 402 one or more of the various systems described herein may identify a plurality of nodes within a computer cluster that are configured to collectively perform at least one task (such as providing access to a database and/or software application). For example, identification module 104 may, as part of coordination point server 202 in FIG. 2, identify a plurality of nodes (e.g., nodes 206 (1)-(4)) that are configured to operate as a computer cluster and to collectively provide high availability to a particular computing application.

The various systems described herein may perform step 402 in a variety of ways. In one example, identification module 104 may identify one or more of nodes 206(1)-(4) upon construction or configuration of system 200. In this example, node-information database 120 may contain information that identifies nodes 206(1)-(4) by identification address (such as an IP address or a MAC address), physical or virtual location, and/or node registration key. In another example, identification module 104 may identify one or more of nodes 206(1)-(4) upon receiving messages from such nodes prior or subsequent to a link-based communication failure, as explained in greater detail below.

At step 404 in FIG. 4, one or more of the systems described herein may receive a failure notification from a node within the computer cluster that identifies a link-based communication failure experienced by the node that prevents the nodes within the computer cluster from collectively performing their assigned task. For example, arbitration module 106 may, as part of coordination point server 202 in FIG. 2, receive a failure notification from node 206(1) that indicates that node 206(1) has just experienced a NIC failure that prevents node 206(1) from collaborating with nodes 206(2)-(4) to provide access to the computing application in question. This link-based communication failure may impair communication within the computer cluster, effectively partitioning the computer cluster into two subclusters: (1) node 206(1), which experienced the NIC failure, and (2) nodes 206(2)-(4), which are capable of communicating with one another subsequent to the NIC failure experienced by node 206(1).

The phrase "link-based communication failure," as used herein, may refer to any communication failure experienced by a node and detected by a module or driver (e.g., a NIC driver) that monitors the health, link status, and/or communication capabilities of a communication interface (e.g., a NIC) on the node. Link-based communication failures may prevent a node from communicating with one or more other nodes within a computer cluster. Examples of link-based communication failures include, without limitation, a failure of a node's NIC, a failure of a cable connected to a node's NIC, a disconnection of a cable connected to the node's NIC, a failure of a network switch (or a port of a network switch) connected to the node's NIC, or the like.

The systems described herein may perform step 404 in a variety of ways. In some embodiments, arbitration module 106 may, as part of coordination point server 202, receive a failure notification from node 206(1) via a kernel-level, low-latency transport mechanism.

The phrase "kernel-level, low-latency transport mechanism," as used herein, may refer to any module or driver that facilitates kernel-to-kernel communication between nodes within a computer cluster and/or between one or more nodes and a coordination point server. More specifically, kernel-level, low-latency transport mechanisms may provide high-speed transport of information exchanged or synchronized between nodes within a computer cluster and/or between one or more of the nodes and the coordination point server. Kernel-level, low-latency transport mechanisms may also be configured to function as a heartbeat network connection that monitors the health, link status, and/or communication capabilities of the nodes within the computer cluster. Examples of kernel-level, low-latency transport mechanisms include, without limitation, SYMANTEC'S LOW-LATENCY TRANSPORT ("LLT") in VERITAS CLUSTER SERVER, SYMANTEC'S GLOBAL ATOMIC BROADCAST ("GAB") in VERITAS CLUSTER SERVER, or any other suitable kernel-level, low-latency transport mechanisms.

In some examples, node 206(1) may detect the link-based communication failure and then generate a carrier-loss notification that identifies the link-based communication failure. For example, an operating system running on node 206(1) may detect a failure of node 206(1)'s NIC and then generate a carrier-loss notification to immediately notify node 206(1) of the NIC failure. More specifically, the operating system running on node 206(1) may include a module or driver that monitors the link status of node 206(1)'s NIC and generates the carrier-loss notification upon detecting the NIC failure.

This carrier-loss notification may be any type or form of notification that provides information identifying the link-based communication failure experienced by node 206(1). The information provided in the carrier-loss notification may also instruct node 206(1) to immediately notify coordination point server 202 of the link-based communication failure. For example, the carrier-loss notification generated by the operating system running on node 206(1) may include a link-based disconnect upcall that instructs node 206(1) to send the failure notification to coordination point server 202 in order to immediately notify coordination point server 202 of the link-based communication failure.

Upon receiving the carrier-loss notification, node 206(1) may send the failure notification that identifies the link-based communication failure to coordination point server 202. The failure notification sent to coordination point server 202 may be similar or identical to the carrier-loss notification generated by the operating system running on node 206(1). For example, node 206(1) may use information from the carrier-loss notification to generate the failure notification sent to coordination point server 202. In another example, upon receiving the carrier-loss notification, node 206(1) may simply relay the carrier-loss notification as the failure notification to coordination point server 202.

At step 406 in FIG. 4, the coordination point may, upon receiving the failure notification, immediately prompt each node within the computer cluster to participate in an arbitration event (such as a fencing race) in order to identify a subset of nodes within the cluster that is to assume responsibility for performing their assigned task subsequent to the link-based communication failure. For example, upon receiving the failure notification from node 206(1), arbitration module 106 may, as part of coordination point server 202 in FIG. 2, immediately prompt nodes 206(1)-(4) to participate in an arbitration event in order to identify a subset of nodes that is to assume responsibility for providing access to the computing application serviced by system 200. This subset of nodes may include at least one less node than the computer cluster as a whole. In this example, the subset of the nodes may include only node 206(1), or alternatively, the subset of the nodes may include nodes 206(2)-(4).

The systems described herein may perform step 406 in a variety of ways. In certain embodiments, arbitration module 106 may immediately prompt nodes 206(1)-(4) to participate in the arbitration event by immediately broadcasting an instruction to participate in the arbitration event to nodes 206(1)-(4). In some examples, arbitration module 106 may broadcast this instruction via a kernel-level, low-latency transport mechanism, such as SYMANTEC'S GAB in VERITAS CLUSTER SERVER.

In various examples, the arbitration event may be a fencing race in which each of nodes 206(1)-(4) attempts to be the first to contact coordination point server 202. For example, upon receiving the instruction to participate in the arbitration event, each of nodes 206(1)-(4) may send a message to coordination point server 202 in an attempt to be the first node to contact coordination point server 202. Each of these messages sent from nodes 206(1)-(4) may identify the node from which the message was sent, thereby enabling arbitration module 106 to identify the node that is first to contact coordination point server 202 subsequent to initiation of the fencing race.

In some examples, arbitration module 106 may identify the node that is the first to contact coordination point server 202 and then identify a subcluster (i.e., a subset of the nodes) within the computer cluster that includes the node that is the first to contact the coordination point server. As such, arbitration module 106 may use a result of the fencing race to identify a subset of nodes that is to assume responsibility for performing the task subsequent to the link-based communication failure. For example, arbitration module 106 may determine (1) that node 206(2) is the first to contact coordination point server 202 subsequent to initiation of the fencing race and (2) that node 206(2) belongs to a subcluster that includes nodes 206(2)-(4). In a complementary example, arbitration module 106 may determine (1) that node 206(1) is the first to contact coordination point server 202 subsequent to initiation of the fencing race and (2) that node 206(1) is the only node in its subcluster.

Upon identifying the subcluster, arbitration module 106 may limit responsibility for performing the task to the subcluster, thereby preventing any node that is not included in the subcluster from performing the task. In other words, arbitration module 106 may use the result of the fencing race to identify at least one node that is to discontinue performing the task subsequent to the link-based communication failure. For example, upon assigning responsibility for providing access to the computing application serviced by system 200 to a subcluster of nodes 206(2)-(4), arbitration module 106 may immediately notify node 206(1) to discontinue performing tasks on behalf of the computing application (by, e.g., shutting down). Upon completion of step 406 in FIG. 4, exemplary method 400 may terminate.

As described above, by causing nodes within a computer cluster that experience link-based communication failures to notify a coordination point server immediately upon detecting such failures, the systems and methods described herein may enable the coordination point server to immediately notify all other nodes within the computer cluster of such failures, thus ensuring that all nodes within the cluster begin participating in the resulting arbitration event at substantially similar points in time. In addition, since the various systems and methods described herein may enable the coordination point sever to immediately prompt each node within the cluster to participate in the arbitration event subsequent to the link-based communication failure, these systems and methods may identify and resolve split-brain scenarios much faster than periodic (e.g., 16 or 32 second-interval) probe-based communication failure-detection techniques, potentially resulting in reduced application unavailability and/or downtime.

Figure 5:
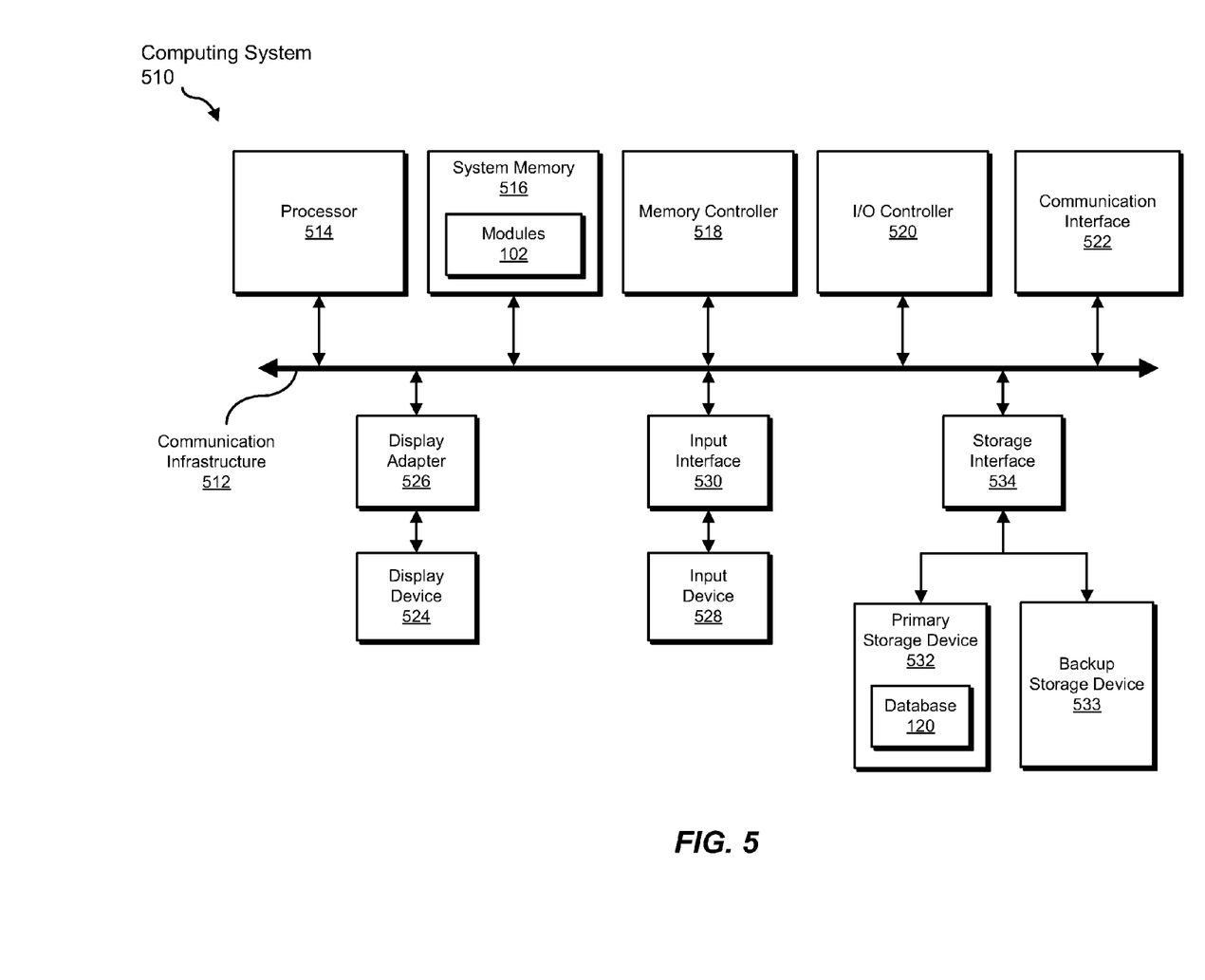
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, receiving, prompting, communicating, broadcasting, and limiting steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as identifying, receiving, prompting, communicating, broadcasting, and limiting.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, receiving, prompting, communicating, broadcasting, and limiting steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, receiving, prompting, communicating, broadcasting, and limiting steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, receiving, prompting, communicating, broadcasting, and limiting steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, receiving, prompting, communicating, broadcasting, and limiting steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
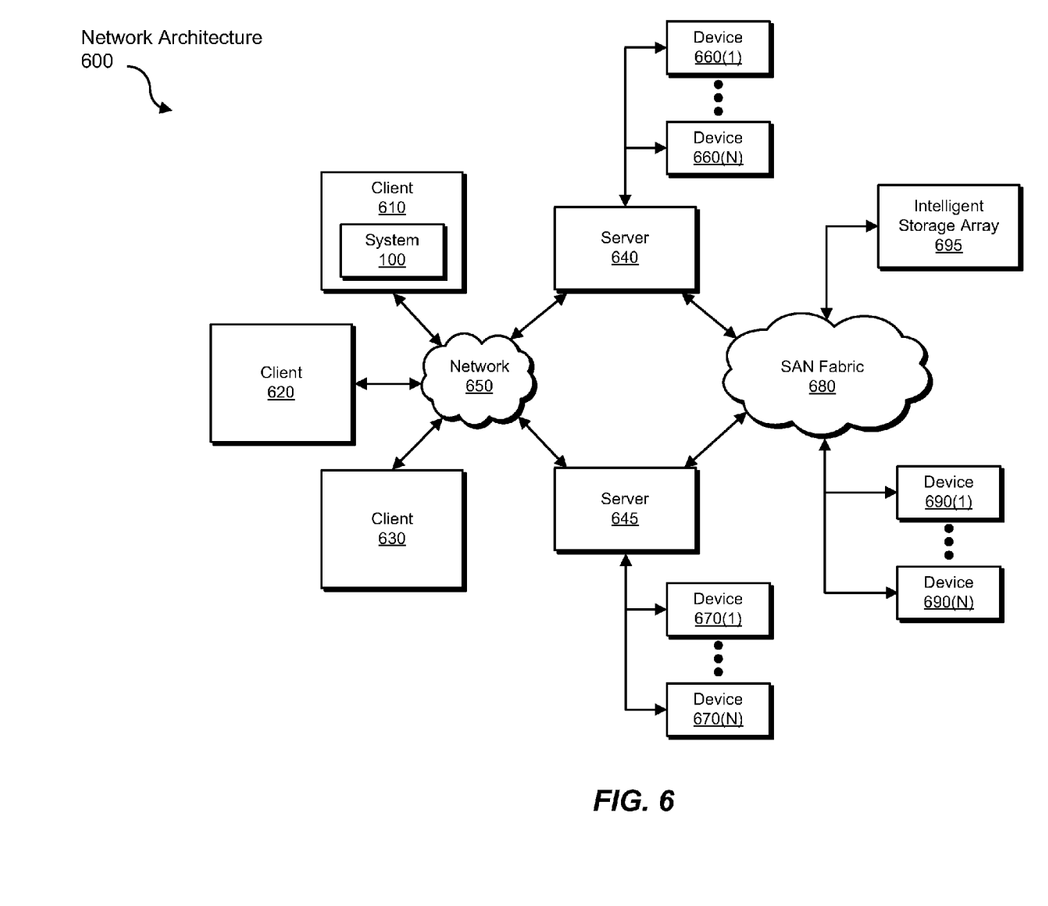
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, receiving, prompting, communicating, broadcasting, and limiting steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for resolving split-brain scenarios in computer clusters.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of modules 102 in FIG. 1 may transform a characteristic or property of a physical device (such as a node) by causing the same to immediately notify a coordination point server upon experiencing a link-based communication failure.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for resolving split-brain scenarios in computer clusters, the method being performed by a coordination point server comprising at least one processor, the method comprising:

identifying a plurality of nodes within a computer cluster that are configured to collectively perform at least one task;

receiving, at the coordination point server from a node within the computer cluster, a failure notification that identifies a link-based communication failure experienced by the node that prevents the nodes within the computer cluster from collectively performing the task;

upon receiving the failure notification at the coordination point server, immediately causing the coordination point server to initiate an arbitration event within the computer cluster in order to identify a subset of the nodes that is to assume responsibility for performing the task subsequent to the link-based communication failure;

wherein the coordination point server initiates the arbitration event by immediately prompting each node within the computer cluster to participate in the arbitration event.

2. The method of claim 1, wherein the coordination point server is capable of communicating with each node within the computer cluster subsequent to the link-based communication failure.

3. The method of claim 1, wherein receiving the failure notification comprises receiving the failure notification via a kernel-level, low-latency transport mechanism.

4. The method of claim 1, wherein the link-based communication failure experienced by the node comprises at least one of:
   failure of the node's network interface controller;
   failure of a cable connected to the node's network interface controller;
   disconnection of a cable connected to the node's network interface controller;
   failure of a network switch connected to the node's network interface controller.

5. The method of claim 1, wherein the link-based communication failure experienced by the node is identified within a carrier-loss notification generated by the node's operating system.

6. The method of claim 1, wherein immediately prompting each node within the computer cluster to participate in the arbitration event comprises immediately broadcasting an instruction to participate in the arbitration event to each node within the computer cluster.

7. The method of claim 6, wherein broadcasting the instruction comprises broadcasting the instruction via a kernel-level, low-latency transport mechanism.

8. The method of claim 1, wherein the arbitration event comprises a fencing race.

9. The method of claim 1, further comprising:
   identifying a node that is the first to contact the coordination point server subsequent to initiation of the arbitration event;
   identifying a subcluster within the computer cluster that includes the node that is the first to contact the coordination point server subsequent to initiation of the arbitration event;
   limiting responsibility for performing the task to the subcluster.

10. A system for resolving split-brain scenarios in computer clusters, the system comprising:
   an identification module installed on a coordination point server and programmed to identify a plurality of nodes within a computer cluster that are configured to collectively perform at least one task;
   an arbitration module installed on the coordination point server and programmed to:
      receive, at the coordination point server from a node within the computer cluster, a failure notification that identifies a link-based communication failure experienced by the node that prevents the nodes within the computer cluster from collectively performing the task;
      upon receiving the failure notification at the coordination point server, immediately cause the coordination point server to initiate an arbitration event within the computer cluster in order to identify a subset of the nodes that is to assume responsibility for performing the task subsequent to the link-based communication failure;
      wherein the arbitration module causes the coordination point server to initiate the arbitration event by immediately prompting each node within the computer cluster to participate in the arbitration event;
   at least one processor configured to execute the identification module and the arbitration module.

11. The system of claim 10, wherein the arbitration module is capable of communicating with each node within the computer cluster subsequent to the link-based communication failure.

12. The system of claim 10, wherein the arbitration module is programmed to receive the failure notification via a kernel-level, low-latency transport mechanism.

13. The system of claim 10, wherein the link-based communication failure experienced by the node comprises at least one of:
   failure of the node's network interface controller;
   failure of a cable connected to the node's network interface controller;
   disconnection of a cable connected to the node's network interface controller;
   failure of a network switch connected to the node's network interface controller.

14. The system of claim 10, wherein the link-based communication failure experienced by the node is identified within a carrier-loss notification generated by the node's operating system.

15. The system of claim 10, wherein the arbitration module is programmed to immediately broadcast an instruction to participate in the arbitration event to each node within the computer cluster.

16. The system of claim 15, wherein the arbitration module is programmed to broadcast the instruction via a kernel-level, low-latency transport mechanism.

17. The system of claim 10, wherein the arbitration event comprises a fencing race.

18. The system of claim 10, wherein the arbitration module is programmed to:
   identify a node that is the first to contact the coordination point server subsequent to initiation of the arbitration event;
   identify a subcluster within the computer cluster that includes the node that is the first to contact the coordination point server subsequent to initiation of the arbitration event;
   limiting responsibility for performing the task to the subcluster.

19. A non-transitory computer-readable-storage medium comprising one or more computer-executable instructions that, when executed by at least one processor of a coordination point server, cause the coordination point server to:
   identify a plurality of nodes within a computer cluster that are configured to collectively perform at least one task;
   receive, at the coordination point server from a node within the computer cluster, a failure notification that identifies a link-based communication failure experienced by the node that prevents the nodes within the computer cluster from collectively performing the task;
   upon receiving the failure notification at the coordination point server, immediately cause the coordination point server to initiate an arbitration event within the computer cluster in order to identify a subset of the nodes that is to assume responsibility for performing the task subsequent to the link-based communication failure;

wherein the coordination point server initiates the arbitration event by immediately prompting each node within the computer cluster to participate in the arbitration event.

20. The non-transitory computer-readable-storage medium of claim 19, wherein the one or more computer-executable instructions, when executed by the coordination point server, further cause the coordination point server to:

identify a node that is the first to contact the coordination point server subsequent to initiation of the arbitration event;

identify a subcluster within the computer cluster that includes the node that is the first to contact the coordination point server subsequent to initiation of the arbitration event;

limiting responsibility for performing the task to the subcluster.

* * * * *